(12) United States Patent
Chao

(10) Patent No.: US 7,614,631 B2
(45) Date of Patent: Nov. 10, 2009

(54) FORK RELEASE MECHANISM OF BICYCLE

(76) Inventor: Hung-Chang Chao, 6F, No. 21, Alley 29, Lane 372, Section 5, Chung-Shiao East Road, Taipei (TW)

( * ) Notice: Subject to any disclaimer, the term of this patent is extended or adjusted under 35 U.S.C. 154(b) by 366 days.

(21) Appl. No.: 11/612,363

(22) Filed: Dec. 18, 2006

(65) Prior Publication Data

US 2007/0138758 A1   Jun. 21, 2007

(51) Int. Cl.
*B62K 21/04* (2006.01)

(52) U.S. Cl. ..................... 280/278; 280/279

(58) Field of Classification Search .............. 280/279, 280/278, 287
See application file for complete search history.

(56) References Cited

U.S. PATENT DOCUMENTS

| | | | | |
|---|---|---|---|---|
| 3,260,535 A * | 7/1966 | Jaulmes | ...................... | 280/279 |
| 4,647,059 A * | 3/1987 | Shan Hai | ...................... | 280/278 |
| 6,116,629 A * | 9/2000 | Koppensteiner | ............. | 280/287 |
| 6,581,492 B1 * | 6/2003 | Chen | .......................... | 74/551.3 |
| 6,935,649 B2 * | 8/2005 | Lim | ........................... | 280/278 |
| 6,984,194 B2 * | 1/2006 | Ma | .............................. | 482/57 |

* cited by examiner

*Primary Examiner*—Kevin Hurley
(74) *Attorney, Agent, or Firm*—Chun-Ming Shih

(57) ABSTRACT

A release device mounted in a bicycle includes a fork including a socket at a bent portion and two yoke arms extended downward from both sides of the socket to mount a front wheel at distal ends thereof; a sleeve fastened in the socket with an upper portion thereof projecting from the socket, the sleeve including at least one longitudinal top slit; an abutment tube including an upper extension passing a head tube to be threadedly secured to a stem; and a clamp put on an upper portion of the sleeve. The clamp is adapted to either fasten the sleeve and the abutment tube together by contracting the slit by exerting a force in a first direction or unfasten the sleeve and the abutment tube by exerting a force in a second direction opposing the first direction.

5 Claims, 10 Drawing Sheets

FORK RELEASE MECHANISM OF BICYCLE

BACKGROUND OF THE INVENTION

1. Field of Invention

The invention relates to bicycles and more particularly to such a bicycle having a quick release mechanism for releasably securing a fork to a head tube.

2. Description of the Prior Art

A conventional folding bicycle is shown in FIG. 11. When the bicycle is not being used, a rear wheel 90 can be downward forward rotated under a crossbar 92 to reduce storage space. Such folding bicycles are manufactured by a major bicycle manufacturing company under the trademark "Brompton".

However, the prior art folding bicycle suffered from a couple of disadvantages. For example, a front wheel 91 disposed at the shown position may hinder the folded rear wheel 90. That is, the rear wheel 90 is not capable of folding to the position indicated by dash lines. For overcoming this drawback, a hinge mechanism 93 is provided in a position proximate a front end of the crossbar 92. Portion of the crossbar 92 in front of the hinge mechanism 93 including the front wheel 91 is folded to one side of the bicycle prior to folding the rear wheel 90. However, the provision of the hinge mechanism 93 inevitably reduces the structural strength of the crossbar 92. Thus, a malfunctioned hinge mechanism 93 can cause a safety problem when riding a bicycle. Further, a rider typically adjusts the hinge mechanism 93 to a very tight state in order to prevent the bicycle frame from vibrating when riding. However, a rider has to exert a great force to adjust the hinge mechanism 93 to such state. This is particularly undesirable for women riders. Thus, the need for improvement still exists.

SUMMARY OF THE INVENTION

It is therefore one object of the invention to provide a release device mounted in a bicycle comprising a fork including a socket at a bent portion and two yoke arms extended downward from both sides of the socket to mount a front wheel at distal ends thereof; a sleeve fastened in the socket with an upper portion thereof projecting from the socket, the sleeve including at least one longitudinal top slit; an abutment tube including an upper extension passing a head tube to be threadedly secured to a stem; and a clamp put on an upper portion of the sleeve, wherein the clamp is adapted to either fasten the sleeve and the abutment tube together by contracting the slit by exerting a force in a first direction or unfasten the sleeve and the abutment tube by exerting a force in a second direction opposing the first direction.

In one aspect of the invention the socket includes two opposite lower first threaded holes, the sleeve further includes two opposite lower second threaded holes aligned with the first threaded holes when the sleeve is fitted in the socket, and the abutment tube further includes two opposite bottom grooves such that driving a fastener through the first and second threaded holes will fasten the fork and the sleeve together with the grooves anchored on the fastener.

In another aspect of the invention there is further provided a hook mounted at one end of an axle of the front wheel such that the detached front wheel, the sleeve, and the fork are adapted to mount on a component of the bicycle.

In yet another aspect of the invention each yoke arm comprises a lateral link extended from the socket, a longitudinal link mounted with the front wheel, and a joining member for threadedly fastening the links together.

In a further aspect of the invention there is further provided a pair of pedals rotatably mounted at both ends of the axle of the front wheel, and wherein the detached fork and the front wheel are adapted to assemble with a seat post and a seat by inserting the sleeve into the seat post prior to being fastened together to form a unicycle by means of the clamp.

BRIEF DESCRIPTION OF THE DRAWINGS

For a more complete understanding of the invention, reference should be made to the embodiments illustrated in greater detail in the accompanying drawings described below by way of example of the invention.

DETAILED DESCRIPTION OF THE PREFERRED EMBODIMENT

Figure 1:
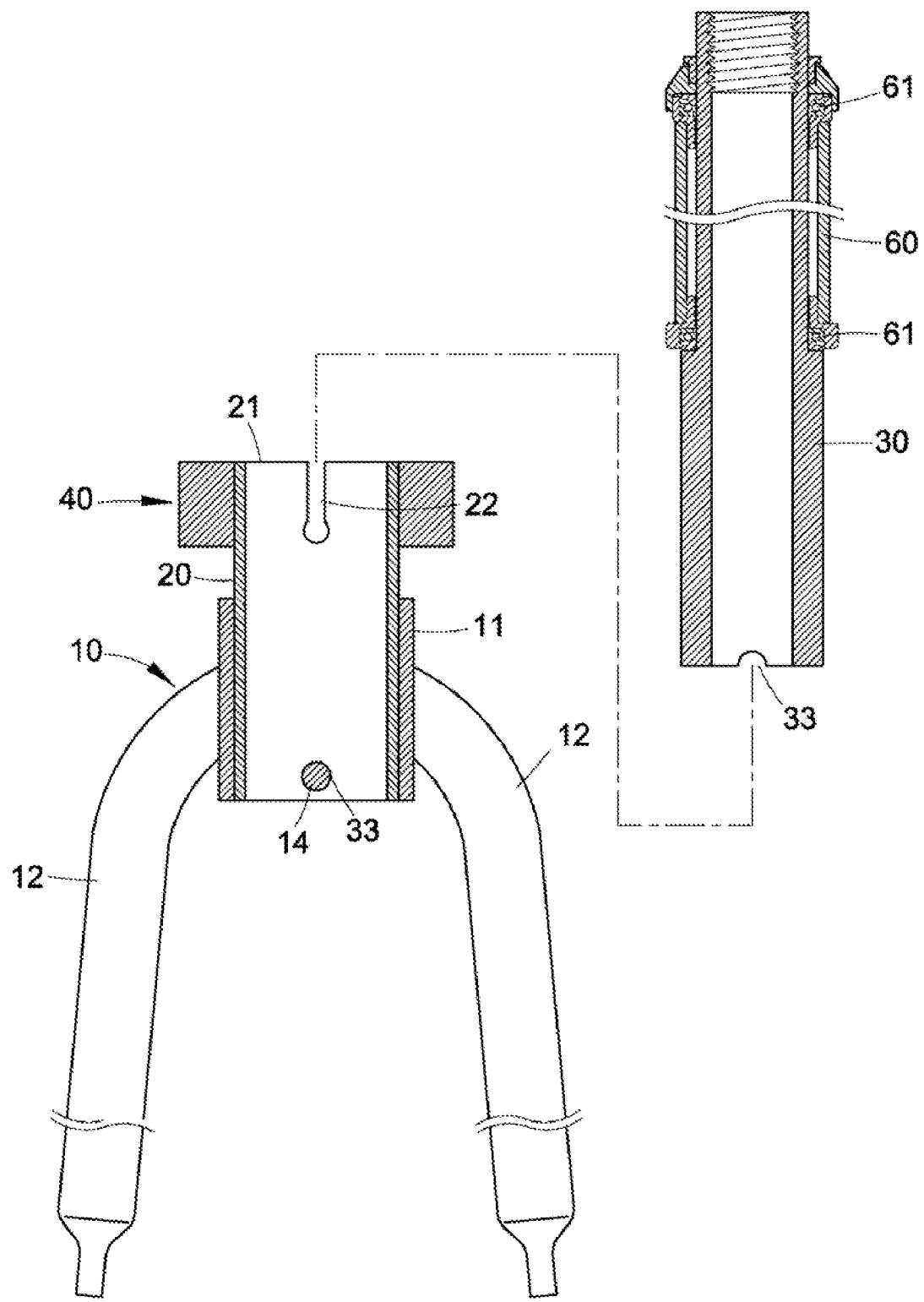
FIG. 1 is a sectional view of a first preferred embodiment of quick release mechanism for releasably securing a fork of a bicycle to a head tube thereof according to the invention where the fork has not assembled with the head tube.
Figure 2:
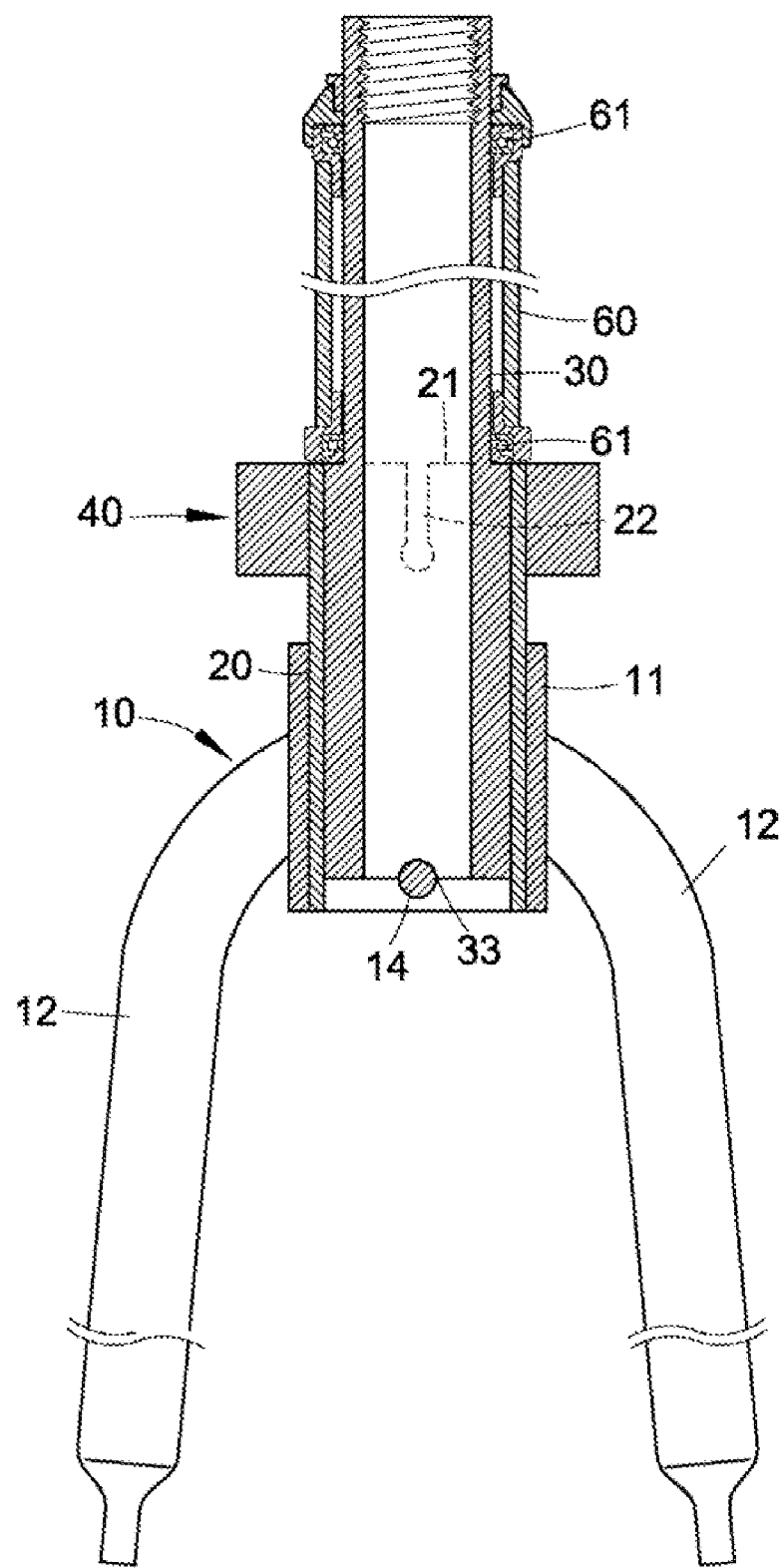
FIG. 2 is a sectional view of the assembled mechanism.
Figure 3:
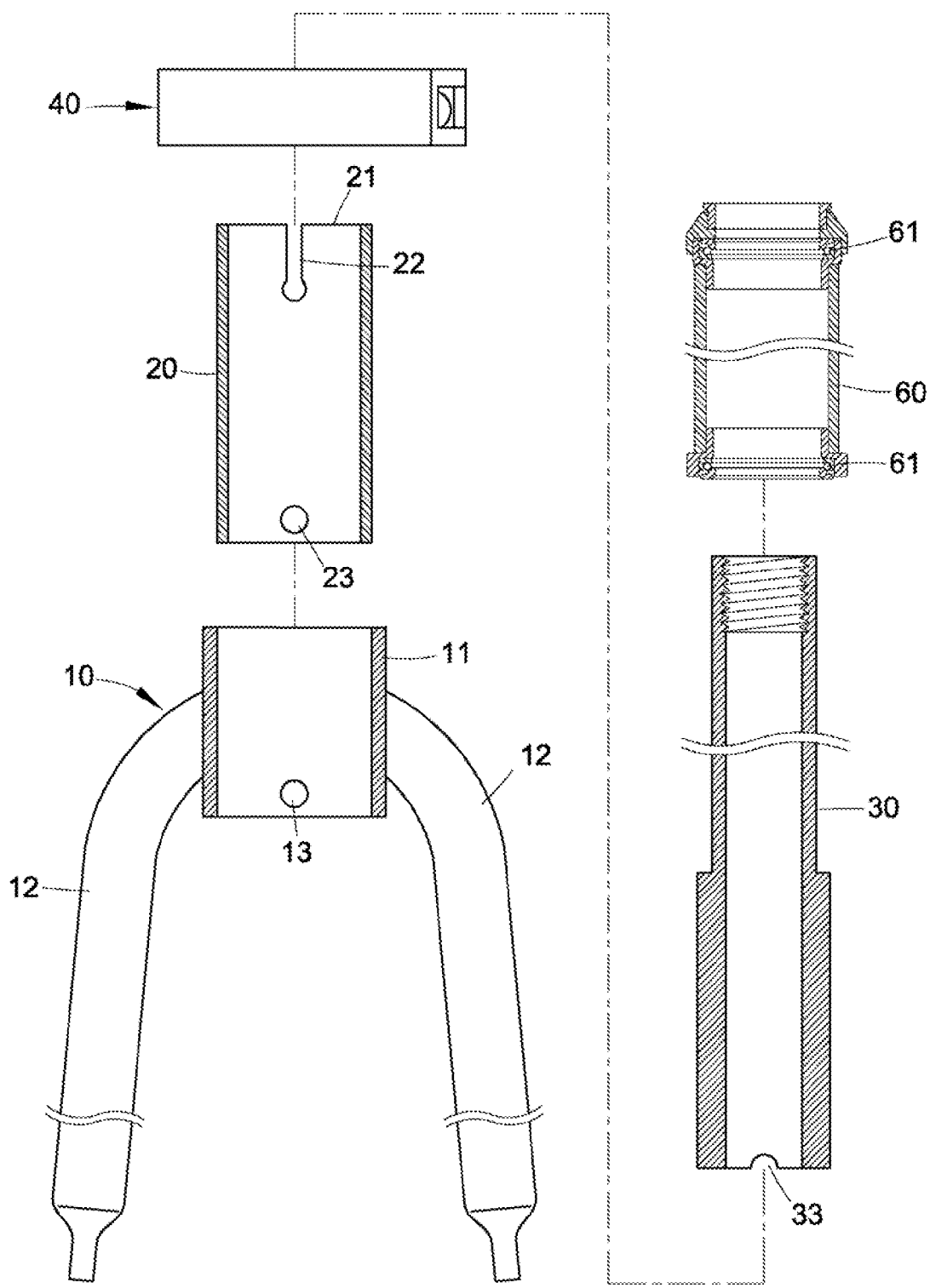
FIG. 3 is an exploded view of the mechanism.
Figure 4:
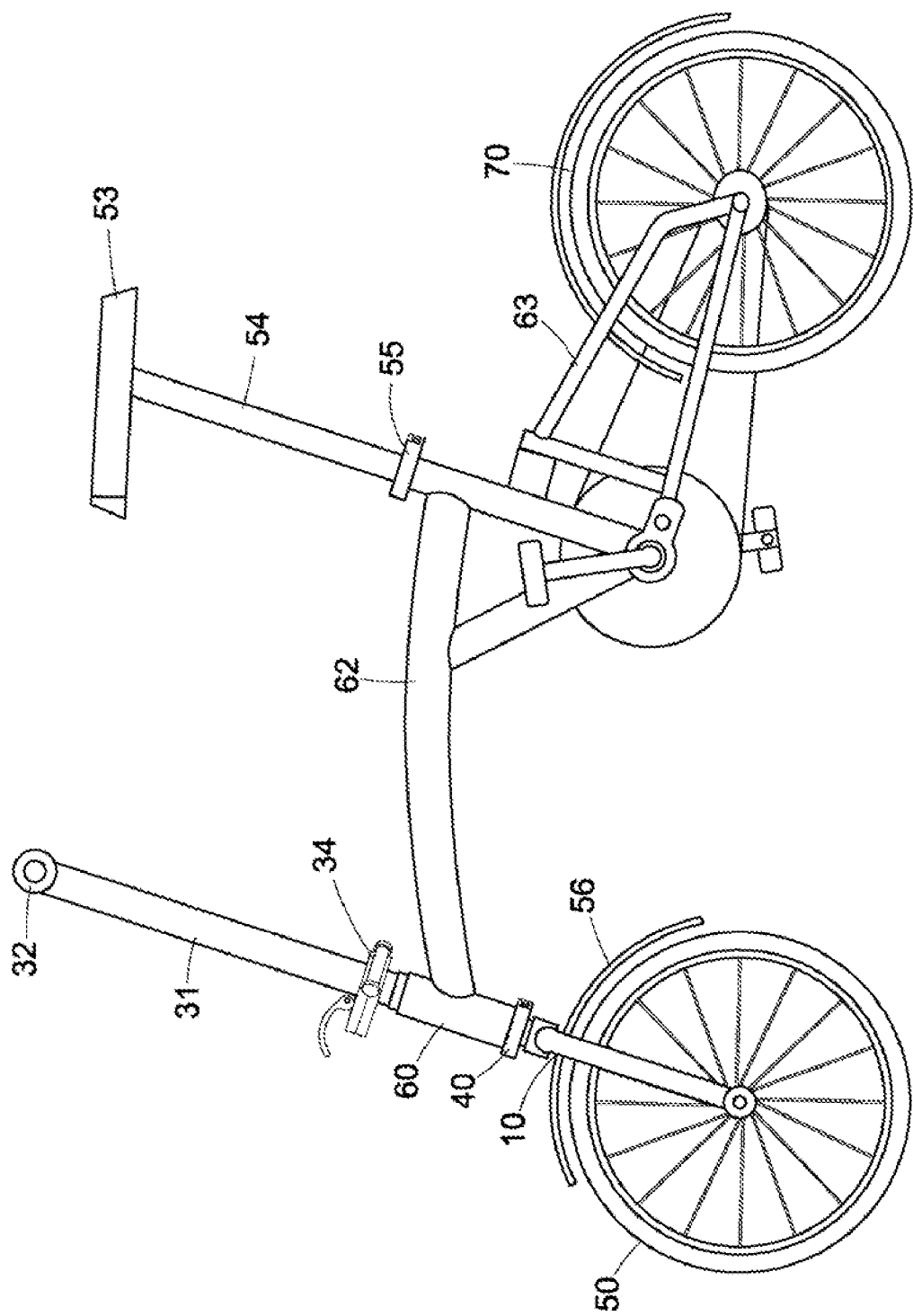
FIG. 4 is a side elevation of a folding bicycle incorporating the mechanism.
Figure 5:
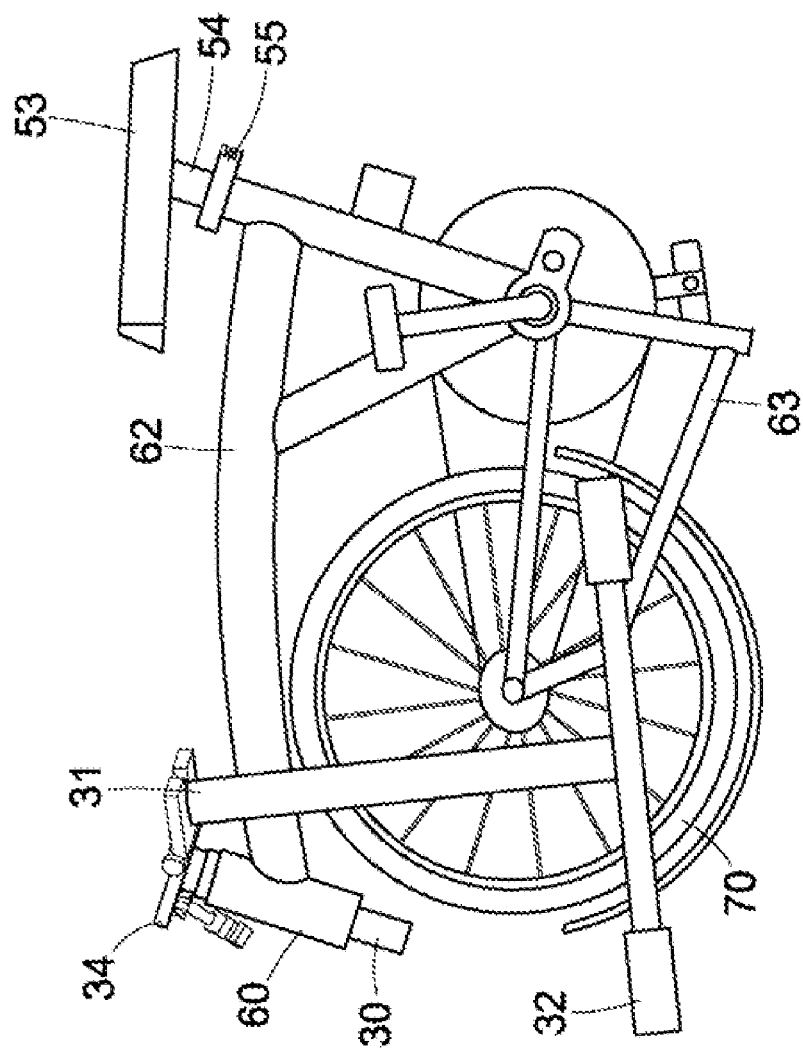
FIG. 5 is a view similar to FIG. 4 where the rear wheel has been folded under the crossbar and the front wheel has been detached from the head tube.
Figure 5:
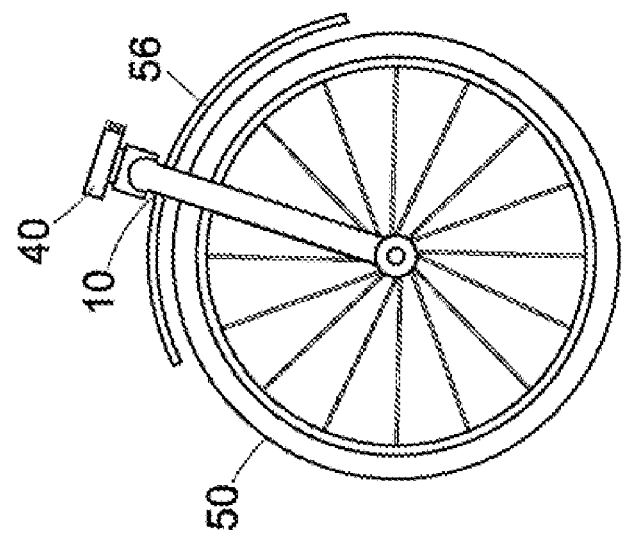

Referring to FIGS. 1 to 5, a bicycle incorporating a first preferred embodiment of quick release mechanism 40 according to the invention is shown. The bicycle comprises a fork 10 including a socket 11 at a bent portion, the socket 11 having two opposite lower first threaded holes 13, and two yoke arms 12 extended downward from both sides of the socket 11 to mount a front wheel 50 at distal ends thereof; a sleeve 20 having a length longer than that of the socket 11 and adapted to partially fit in the socket 11 with an upper portion thereof projecting from the socket 11, the sleeve 20 including a longitudinal slit 22 extending downward a predetermined distance from a top 21, and two opposite lower second threaded holes 23 adapted to align with the first threaded holes 13 when the sleeve 20 is fitted in the socket 11. A bolt and nut combination 14 is driven through the first and second threaded holes 13 and 23 for fastening the socket 11 and the sleeve 20 together.

The bicycle further comprises a quick release mechanism 40 adapted to mount around the sleeve 20 with their tops being flush each other as detailed later; an abutment tube 30 including a smaller upper extension and two opposite bottom grooves 33. The abutment tube 30 is adapted to fit in the sleeve 20 with the grooves 33 anchored on the bolt and nut combination 14. As a result, the socket 11, the sleeve 20 and the abutment tube 30 are secured together. Note that the bolt and nut combination 14 can be additionally secured to a front fender 56. The bolt and nut combination 14 can also be replaced by a locking pin or the like in other embodiments.

The bicycle further comprises a head tube 60 including bottom and upper fastening rings 61. The head tube 60 is adapted to securely put on the extension of the abutment tube 30 with the bottom fastening ring 61 fastened around an annular shoulder of the abutment tube 30 and a top of the abutment tube 30 projecting out of a top of the head tube 60. The projecting portion of the abutment tube 30 is threadedly secured to a stem 31 which is in turn mounted with handlebars 32. A well known folding device 34 is mounted at a joining portion of the stem 31 and the head tube 60 such that both the stem 31 and the handlebars 32 can be downward folded.

The bicycle further comprises the following well known components such as a seat 53, a seat post 54, a quick release 55 for fastening a lower portion of the seat post 54 in a seat tube (not numbered), a rear wheel 70, a chain stay 63, and a crossbar 62.

Figure 6:
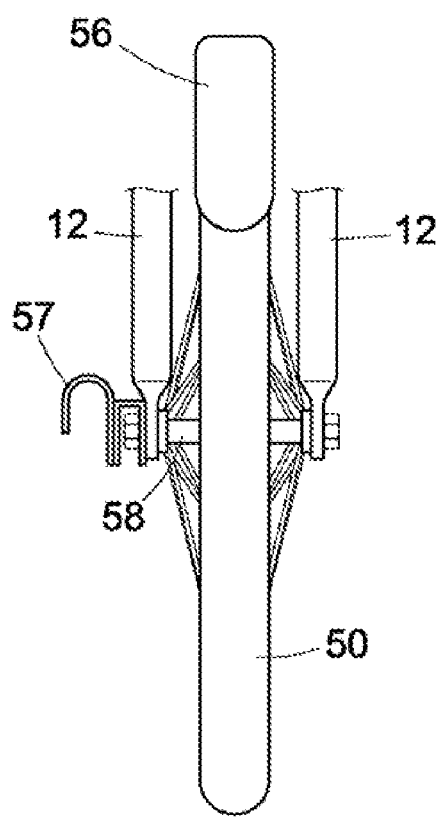
FIG. 6 is a front view of the front wheel with a hook mounted at one end of an axle thereof.

Referring to FIG. 6 in conjunction with FIGS. 1 to 5, a hook 57 is mounted at one end of an axle 58 of the front wheel 50. After detaching the front wheel 50, the sleeve 20, and the fork 10, they can be mounted on, for example, the chain stay 63 by hanging the hook 57 on the chain stay 63. A hanging device (not shown) is also provided. The hanging device has both ends secured to the head tube 60 and the fork 10 respectively. As such, the hanging device is adapted to hang the detached sleeve 20, the fork 10, and the front wheel 50 under the head tube 60. Further, the hanging device has a length sufficient to not cause the front wheel 50 to interfere with the folding of the rear wheel 70.

Figure 7:
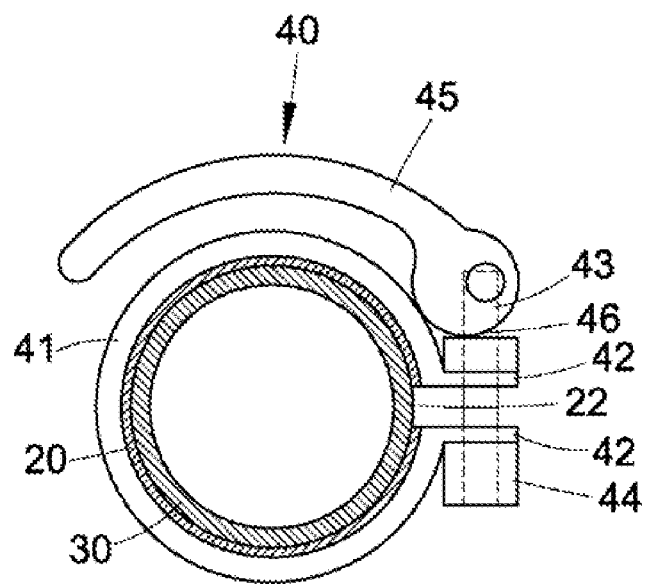
FIG. 7 is a sectional view of the mounted mechanism.

Referring to FIG. 7 in conjunction with FIGS. 1 to 5, a detaching operation of the quick release mechanism 40 will be described in detailed below. The quick release mechanism 40 is a well known device and comprises a C-shaped ring 41 put on the sleeve 20 and being flush with the top 21 of the sleeve 20, two bosses 42 at both ends of the ring 41, a bolt 43 driven through the bosses 42, a nut 44 threadedly secured to the bolt 43, and an arcuate pivotal lever 45 extended from a position proximate one end of the bolt 43 opposite the nut 44. A rider may clockwise turn the lever 45 to bear a cam edge 46 thereof against one boss 42 and the ring 41 for flexibly contracting the slit 22. As a result, the sleeve 20 and the abutment tube 30 are fastened together. To the contrary, the rider may counterclockwise turn the lever 45 to cause the cam edge 46 to stop exerting a clamping force on one boss 42 and the ring 41. As such, the slit 22 returns to its unfastened state with the abutment tube 30 being unfastened by the sleeve 20 (see FIG. 7). Thereafter, the rider may easily detach the sleeve 20 and thus both the fork 10 and the front wheel 50 from the abutment tube 30.

Figure 8:
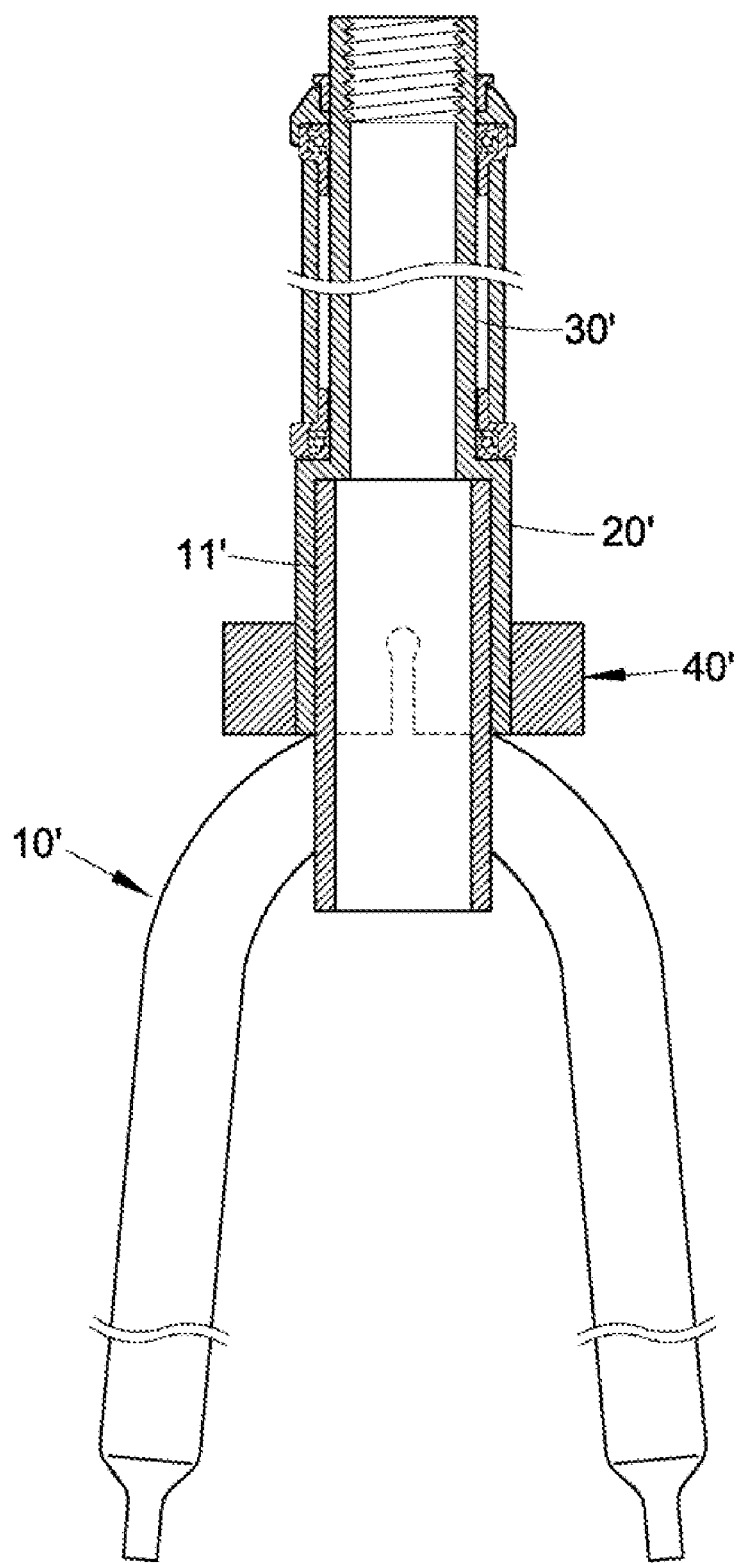
FIG. 8 is a sectional view of a second preferred embodiment of quick release mechanism for releasably securing a fork of a bicycle to a head tube thereof according to the invention where the fork has assembled with the head tube.

Referring to FIG. 8, a second preferred embodiment of quick release mechanism according to the invention is shown. The characteristics of the second preferred embodiment are detailed below. The sleeve 20' and the abutment tube 30' are formed as an integral member with the sleeve 20' formed as a lower portion of the abutment tube 30'. Also, the fork 10' is fitted in the sleeve 20' with a top of the fork 10' urged against a joining portion of the sleeve 20' and the abutment tube 30'. Further, the quick release mechanism 40' is adapted to clamp to fasten the sleeve 20' and the fork 10' together or not.

Figure 9:
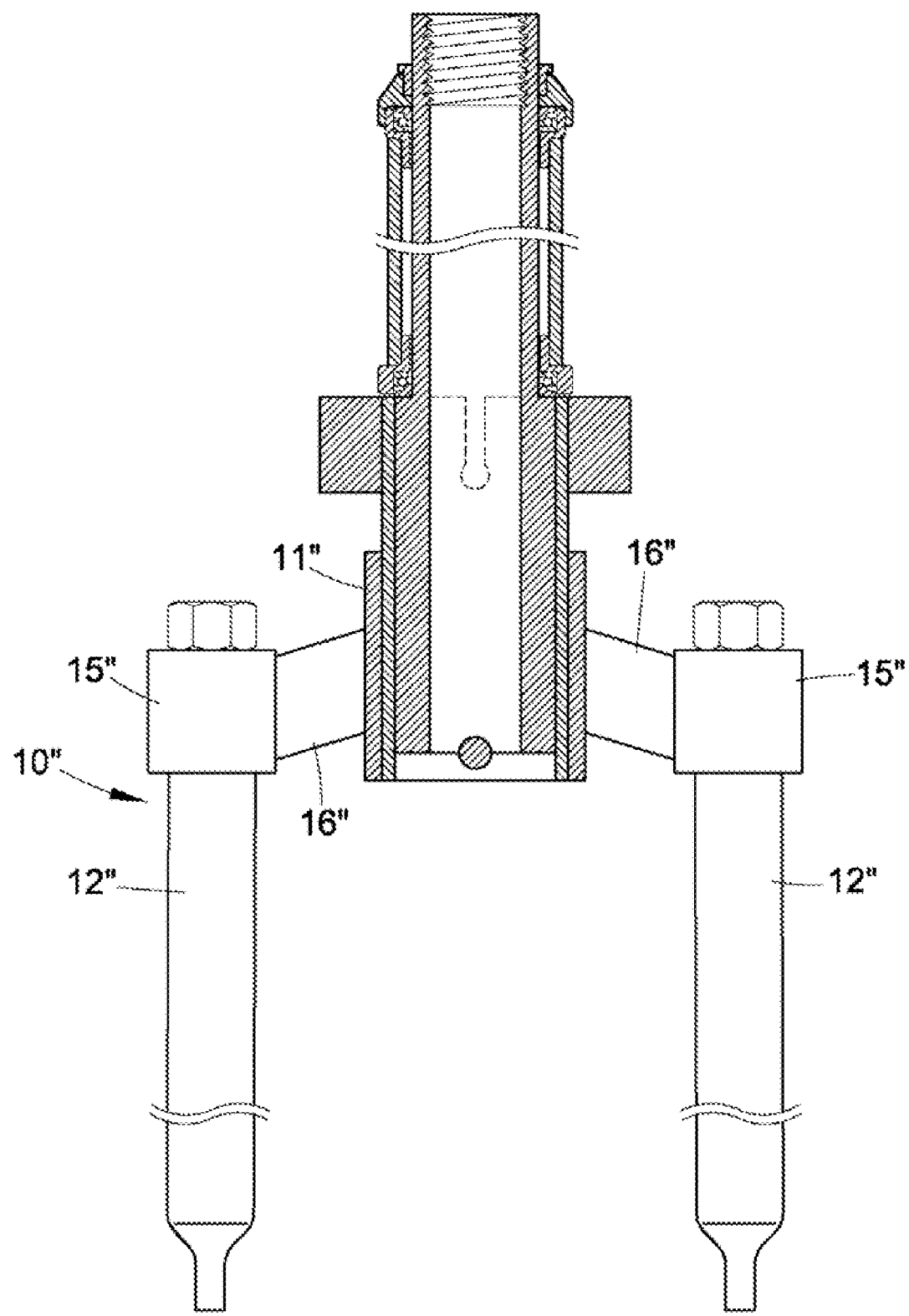
FIG. 9 is a sectional view of a third preferred embodiment of quick release mechanism for releasably securing a fork of a bicycle to a head tube thereof according to the invention where the fork has assembled with the head tube.

Referring to FIG. 9, a third preferred embodiment of quick release mechanism according to the invention is shown. The characteristics of the third preferred embodiment are detailed below. The fork 10" comprises two substantially inverted L-shaped yoke arms each including a lateral link 16" extended from the socket 11", a longitudinal link 12", and a joining member 15" having a lower end secured to the axle of the front wheel and adapted to threadedly fasten the links 16" and 12" together. The third embodiment is particularly applicable to a folding bicycle having a shock absorber mounted in the front wheel.

Figure 10:
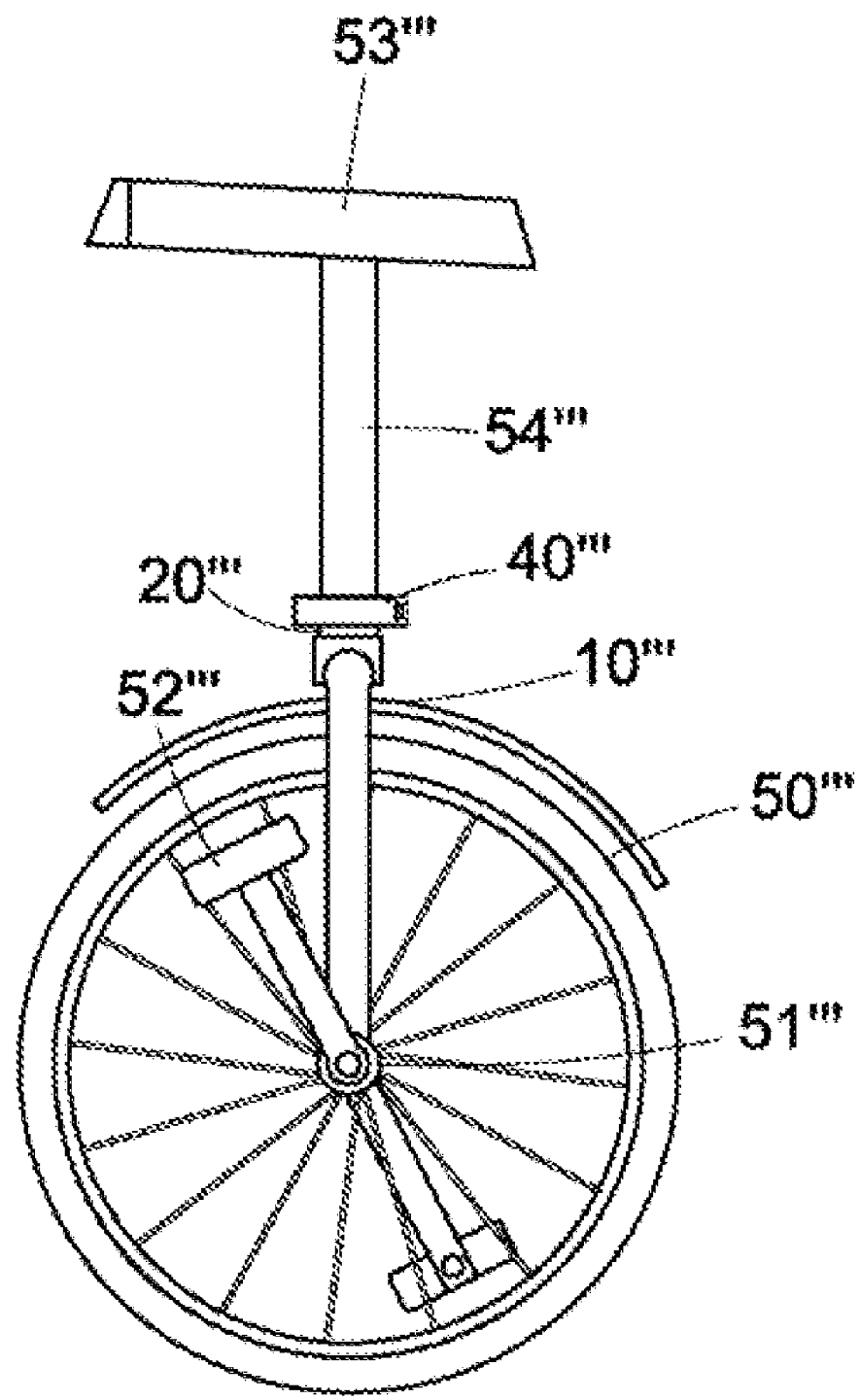
FIG. 10 is a side elevation of a fourth preferred embodiment of quick release mechanism for releasably securing a fork of a unicycle to a head tube thereof according to the invention.
Figure 11:
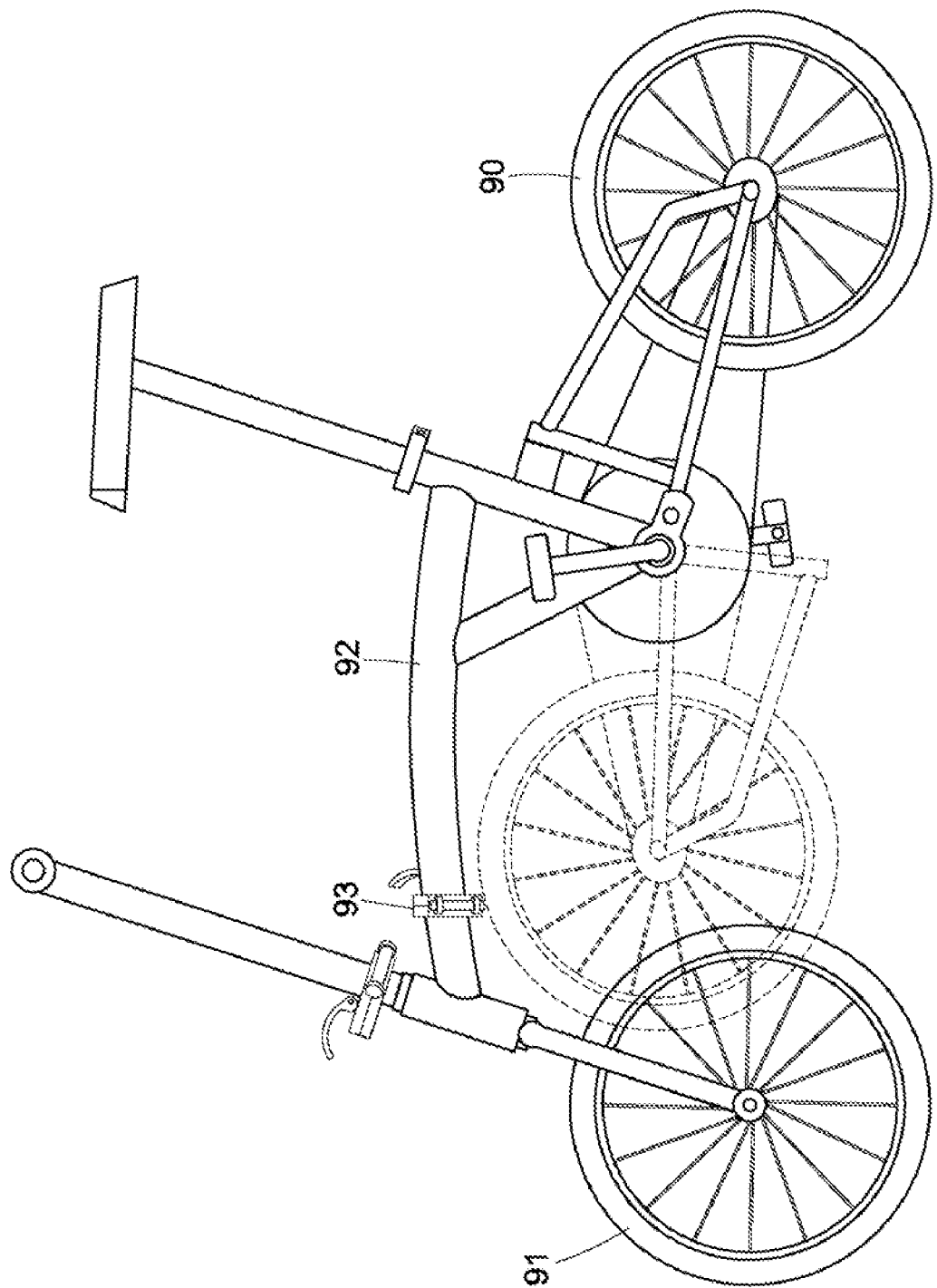
FIG. 11 is a side elevation of a conventional folding bicycle.

Referring to FIG. 10, a fourth preferred embodiment of quick release mechanism according to the invention is shown. The characteristics of the fourth preferred embodiment are detailed below. The fourth embodiment is mounted in a unicycle. In detail, a pair of pedals 52'" are rotatably mounted at both ends of an axle 51'" of a front wheel 50'". A rider may detach both the fork 10'" and the front wheel 50'". Next, the rider may assemble the fork 10'" and the front wheel 50'" with the seat post 54'" and the seat 53'" by inserting the sleeve 20'" into the seat post 54'". Finally, fasten them together by means of the quick release mechanism 40'". The fourth embodiment is particularly applicable to a particular type of bicycles for children.

Note that a further quick release may be mounted between the front wheel and the fork in some types of folding bicycle. In this case, the front wheel can be detached from the fork by unfastening the quick release. However, the front fender may occupy a relatively large space even after detaching the front wheel from the bicycle since the front fender and the fork are formed together. Advantageously, in the invention the fork, the front fender, and the front wheel are adapted to detach from the bicycle. As a result, a great storage space of the bicycle is saved after detaching the fork, the front fender, and the front wheel from the bicycle as contemplated by the invention.

Further note that it is typical for a bicycle having a brake mounted on its front wheel. Advantageously, it is not required to detach the sufficiently long front brake line since, as stated above, the detached fork and other associated components either can be mounted on the chain stay 63 by hanging the hook 57 on the chain stay 63 or the hanging device can be employed to hang the detached fork 10 and other associated components under the head tube 60. Alternatively, a well known pedal brake without a brake line can be mounted in the bicycle of the invention if the fork 10 and other associated components are designed to be placed in a position distal from the main components of the folding bicycle after detaching. Still contemplated by the invention that a brake having a detachable brake line can be mounted in the front wheel. For example, such brake has two metal hooks adapted to fasten together in an intermediate portion of its brake line.

In brief, the folding of the bicycle of the invention involves no tool and the folding procedure is simple and quick. Further, no interference occurs between the folded rear wheel and the front wheel. Further, the typical hinge mechanism is eliminated, i.e., the structural strength of the bicycle of the invention is completely not adversely affected by its folding feature.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A release device mounted in a bicycle, comprising:
 a fork including a socket at a bent portion and two yoke arms extended downward from both sides of the socket to mount a front wheel at distal ends thereof;
 a sleeve fastened in the socket with an upper portion thereof projecting from the socket, the sleeve including at least one longitudinal top slit;

an abutment tube, fitted into the sleeve, including an upper extension passing a head tube to be threadedly secured to a stem; and a clamp put on an upper portion of the sleeve, wherein the clamp is adapted to either fasten the sleeve and the abutment tube together by contracting the slit by exerting a force in a first direction or unfasten the sleeve and the abutment tube by exerting a force in a second direction opposing the first direction.

2. The release device of claim 1, wherein the socket includes two opposite lower first threaded holes, wherein the sleeve further includes two opposite lower second threaded holes aligned with the first threaded holes when the sleeve is fitted in the socket, and wherein the abutment tube further includes two opposite bottom grooves such that driving a fastener through the first and second threaded holes will fasten the fork and the sleeve together with the grooves anchored on the fastener.

3. The release device of claim 1, further comprising a hook mounted at one end of an axle of the front wheel such that the detached front wheel, the sleeve, and the fork are adapted to mount on a component of the bicycle.

4. The release device of claim 1, wherein each yoke arm comprises a lateral link extended from the socket, a longitudinal link mounted with the front wheel, and a joining member for threadedly fastening the links together.

5. The release device of claim 1, further comprising a pair of pedals rotatably mounted at both ends of the axle of the front wheel, and wherein the detached fork and the front wheel are adapted to assemble with a seat post and a seat by inserting the sleeve into the seat post prior to being fastened together to form a unicycle by means of the clamp.

* * * * *